United States Patent [19]
Herdzina et al.

[11] Patent Number: 5,329,800
[45] Date of Patent: Jul. 19, 1994

[54] CONVERSION SYSTEM HAVING CONVEYOR SLIDE ASSEMBLY FOR MULTIPLE BELTS

[75] Inventors: Frank J. Herdzina, South Barrington; Steven F. Herdzina, McHenry, both of Ill.

[73] Assignee: Service Tool International, Inc., Elk Grove Village, Ill.

[21] Appl. No.: 16,570

[22] Filed: Feb. 11, 1993

[51] Int. Cl.$^5$ .............................................. B21D 24/16
[52] U.S. Cl. ...................................... 72/361; 198/814
[58] Field of Search ..................... 198/806, 814, 835; 72/348, 361, 426

[56] References Cited
U.S. PATENT DOCUMENTS 2,674,366  4/1954  Kindseth et al. .................. 198/814
4,977,772 12/1990  Bulso, Jr. et al. ..................... 72/348

Primary Examiner—Lowell A. Larson
Attorney, Agent, or Firm—Dorn, McEachran, Jambor & Keating

[57] ABSTRACT

A conversion system for converting easy-open can ends has an improved slide assembly capable of handling multiple conveyor belts with improved tension and vibration control. The slide assembly includes a stationary idler shaft mounted transverse to the conveyor axis on a take-up slide. At least two guide pins extend from the shaft parallel to the conveyor axis. Each guide pin mounts a cylindrical bearing holder thereon. The bearing holders are both pivotable and slidable on the guide pins. Springs disposed in pockets in the idler shaft bias the bearing holders. The bearing holders each mount a drum for rotation with the drum's axis parallel to the idler shaft. The pivoting of the bearing holders accommodates conveyor belt camber while the sliding permits tension adjustment and control.

19 Claims, 3 Drawing Sheets

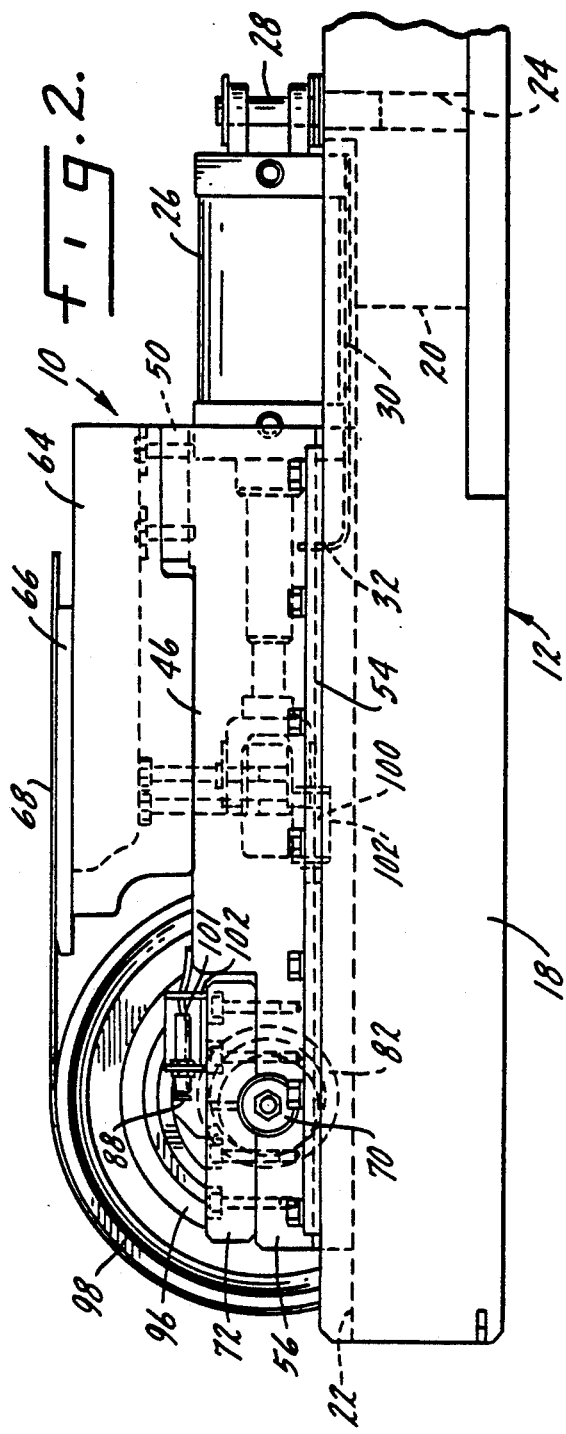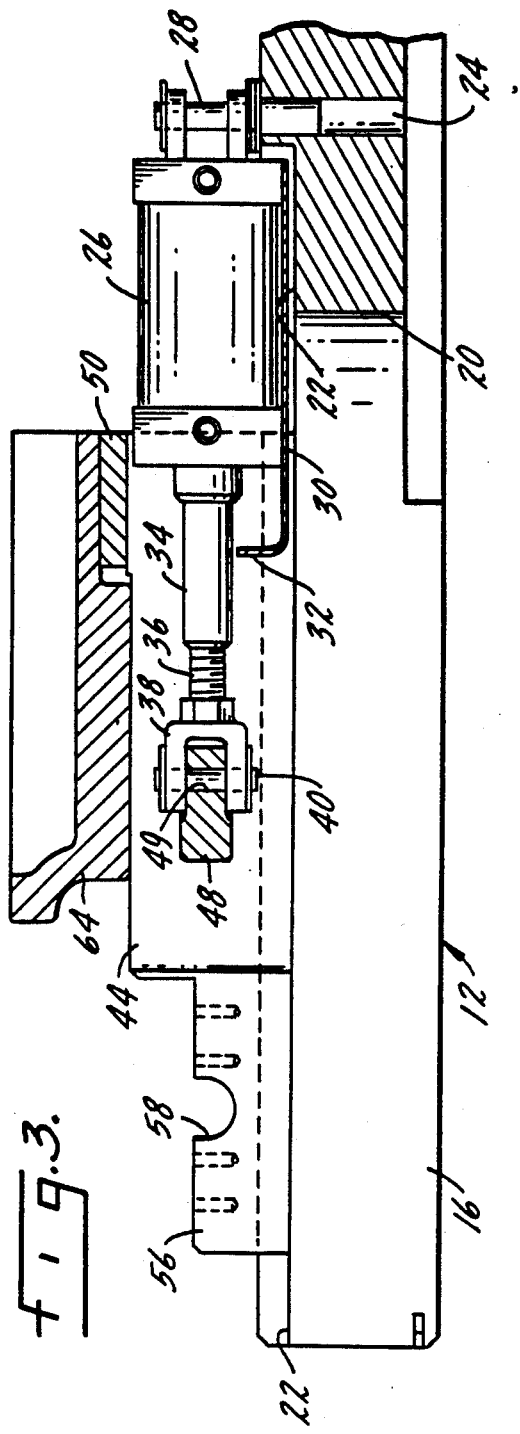

CONVERSION SYSTEM HAVING CONVEYOR SLIDE ASSEMBLY FOR MULTIPLE BELTS

BACKGROUND OF THE INVENTION

This invention relates to conversion systems of the type used to convert circular metal workpieces called shells into can ends, especially easy-open ends. A conversion system is basically a large press having cooperatively-engageable, reciprocable upper and lower tooling. The tooling has appropriate punches and dies which define a plurality of stations wherein shells are progressively converted into can ends. At least one endless conveyor indexes the shells into and through the stations of the tooling. Conversion systems typically have multiple rows or lanes of stations so that multiple ends are formed on each stroke of the press. U.S. Pat. No. 5,017,072, the disclosure of which is incorporated herein by reference, shows further details of the overall conversion system.

The conveyor belt is an endless loop, usually made of steel, and having openings in which the shells rest. The conveyor revolves around head and tail pulleys. Usually the head pulley is driven and the tail pulley is an idler. The tail pulley is mounted on a slide assembly to permit adjustment of the conveyor belt tension. Accurate indexing of the shells requires proper tension on the belt.

Recent advances in tooling permit ends of differing diameters to be made at the same time. That is, one lane can be making one size end while an adjacent lane is making a different size end. Co-pending application Ser. No. 08/001,256, filed Jan. 6, 1993, entitled "End Tooling for Multiple End Diameters", assigned to the present assignee and which is incorporated herein by reference, discloses tooling of this type. Each lane in the multiple-diameter type tooling requires its own conveyor belt, with the openings therein sized for the particular end being made. But the tension of multiple belts cannot be individually adjusted with the slide assemblies of the prior art. Neither can conventional pulleys allow sensing of belt breakage, should it occur. Moreover, conventional pulleys will not adjust for the individual camber of multiple belts. These problems are addressed by the present invention.

SUMMARY OF THE INVENTION

This invention is concerned with conversion systems for making can ends and is particularly directed to a slide assembly for mounting multiple pulleys for multiple conveyor belts.

A primary object of the invention is a slide assembly having multiple pulleys.

Another object of the invention is multiple pulley slide wherein each pulley is individually slidable and pivotable.

Yet another object of the invention is a multiple pulley slide for multiple belts having sensors for detecting breakage of a belt. The sensors also identify which belt has broken.

A further object is a slide assembly of the type described which reduces vibration in the belts.

Still another object of the invention is a slide assembly which permits two, three or more belts to be accommodated in a confined area. This allows the use of only a single tensioning cylinder, rather than separate cylinders for each belt.

These and other objects which may appear in the following specification and drawings are realized by a conversion system of the type having cooperatively-engageable, reciprocable upper and lower tooling defining a plurality of stations in multiple lanes. Each station has tools which progressively convert shells into can ends. An endless conveyor for each lane indexes shells into and through the stations of the tooling. Each conveyor revolves around its own head and tail pulleys and defines a longitudinal axis. The tail pulleys are mounted on a fixed idler shaft attached to a slide assembly which in turn is slidably mounted on the conversion system's bolster.

A guide pin for each pulley is press fit in the idler shaft and extends parallel to the conveyor's axis. A bearing holder sleeve is mounted on each guide pin such that the sleeve is slidable on the guide pin in a direction parallel to the conveyor's longitudinal axis. The bearing holder sleeve is also pivotable about the guide pin. Springs held in pockets formed in the idler shaft bias the sleeve in a direction which adds tension to the belt.

Bearings mounted on the bearing holder sleeve support a cylindrical drum for rotation about the sleeve. The outer surface of the drum engages the conveyor belt. Sensors placed adjacent each drum detect movement of the drum from its normal position so if a belt breaks the sensors can shut down the press and identify which belt has failed.

A method of reducing belt tension is also provided wherein the pivotable drum allows 100% contact between the belt and drum. Full contact between the belt and drum, regardless of belt camber, reduces belt vibration.

BRIEF DESCRIPTION OF THE DRAWINGS

FIG. 2 is a side elevation view of the slide assembly on the bolster.

FIG. 3 is a section of the take-up slide with parts removed, taken substantially along line 3—3 of FIG. 1.

DETAILED DESCRIPTION OF THE INVENTION

Figure 1:
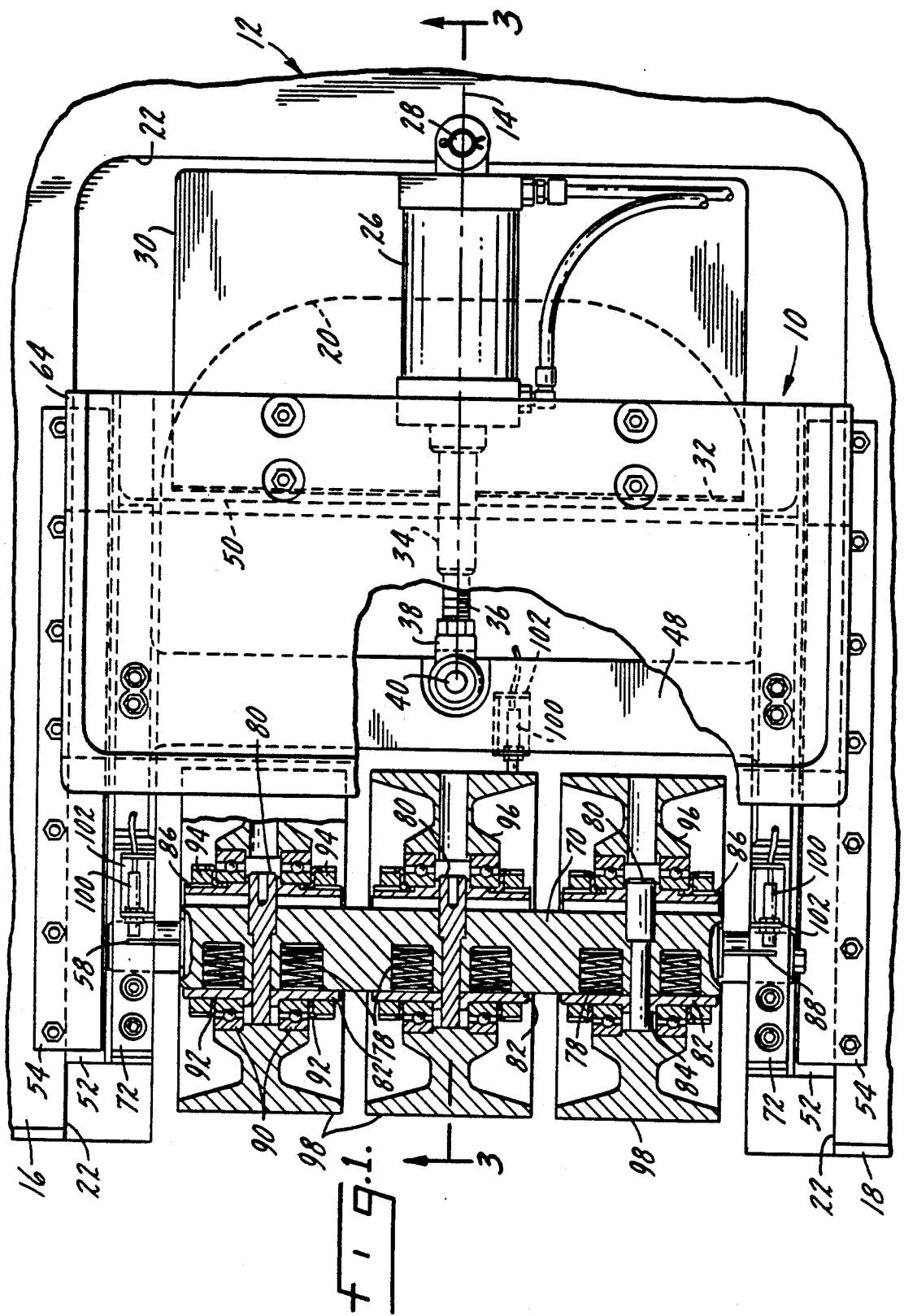
FIG. 1 is a top plan view of a slide assembly for multiple belts, shown mounted in the end of a conversion system's bolster, with parts in section.
Figure 4:
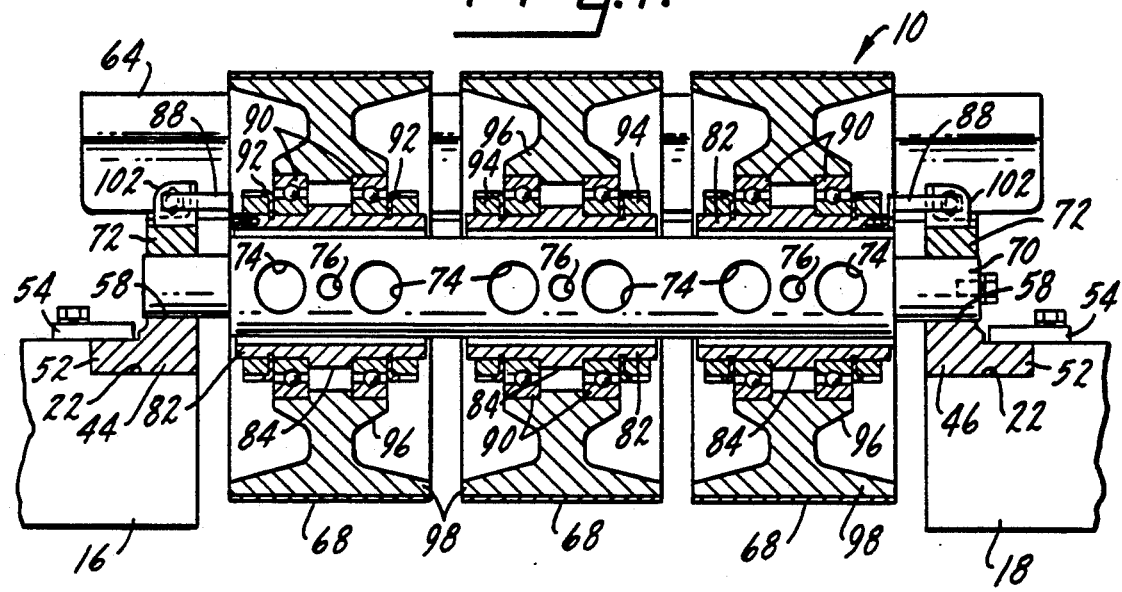
FIG. 4 is an end elevation view of the slide assembly and bolster.

The slide assembly of the present invention is shown generally at 10 in FIGS. 1, 2 and 4. The slide assembly has multiple pulleys each of which can rotate, pivot and translate. These three degrees of freedom allow the pulleys to adjust for tension and camber even though they are mounted on a common take-up slide. The use of a common take-up slide saves space and material, permitting multiple belts to be run on a single press.

The slide assembly is mounted on an end of a bolster 12 having a longitudinal axis shown at 14 in FIG. 1. The end of the bolster has a generally U-shaped cutout to accommodate the pulleys. The cutout defines a pair of longitudinally-extending arms 16 and 18 which are connected by a bight portion 20. The top surface of the bolster has a depression 22 extending around the bight portion 20 and down the arms 16 and 18 to the ends of the bolster. Immediately adjacent the depression 22 on the axis 14 is a bore 24 as best seen in FIGS. 2 and 3.

A take-up slide air cylinder 26 is pivotally mounted to the bolster by a mounting post 28 which fits through lugs at one end of the cylinder housing. The post 28 extends into the bore 24. A slide guard plate 30 is bolted to the bottom of the cylinder housing. This plate rests partially in the depression 22 adjacent the bight portion 20 and spans most of the cutout between the bolster arms. The plate has an upturned lip 32 beneath the cylinder rod 34. The rod 34 includes a threaded portion 36 which is threadedly connected to a clevis 38. The clevis in turn is pinned to the take-up slide by a pin 40.

Figure 5:
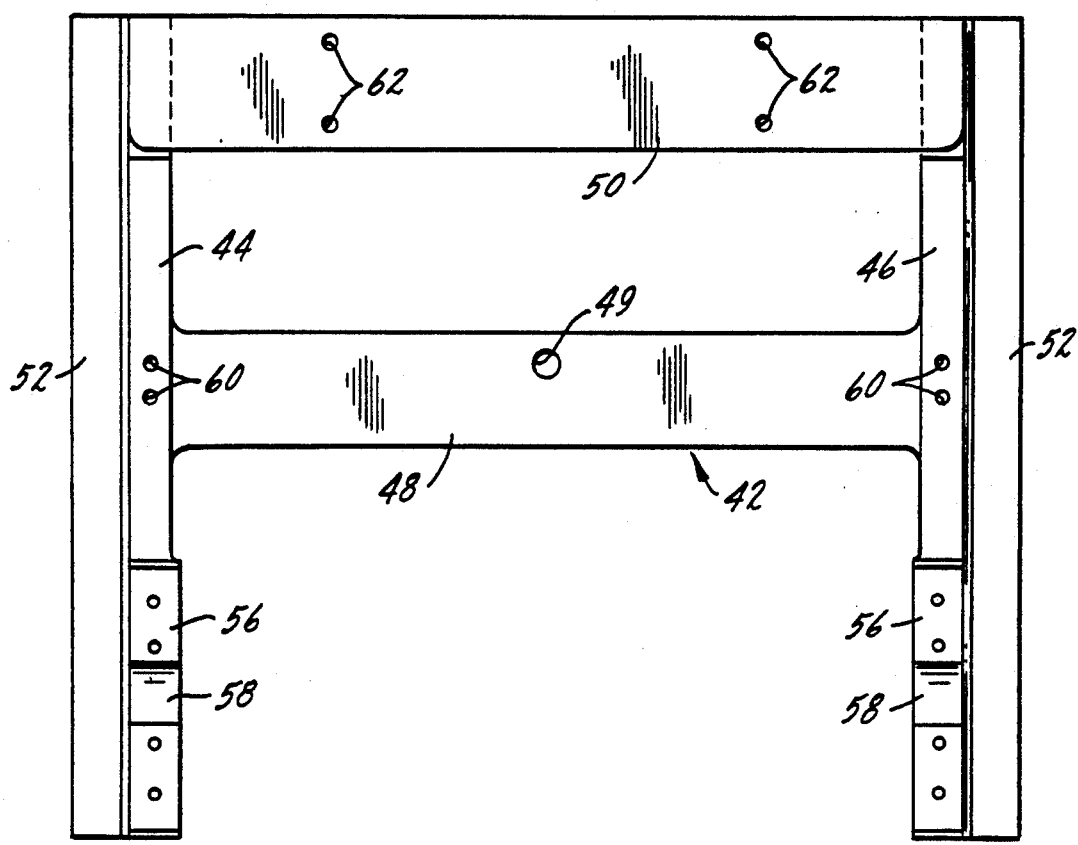
FIG. 5 is a top plan view of the take-up slide by itself.

The take-up slide 42 is shown by itself in FIG. 5. It has longitudinal side rails 44 and 46 joined by a transverse center beam 48 and an end beam 50. Center beam 48 has a hole 49 for receiving the clevis pin 40. Each rail 44, 46 has flange 52 extending laterally from the rail at the foot thereof. The flanges lie in the depression 22 of the bolster (FIG. 4). Slide clamps 54 bolted to the arms 16 and 18 engage the flanges 52 to hold the slide in place. The ends of the rails opposite the beam 50 have idler shaft cradles 56. Each cradle has four bolt holes and a semi-circular seat 58, as seen in FIG. 3.

The rails 44, 46 have bolt holes 60 and the end beam 50 has four bolt holes 62 for receiving bolts which mount a ramp support plate 64 on top of the take-up slide 42. Plate 64 supports a ramp 66 as seen in FIG. 2. The ramp 66 in turn supports the conveyor belts, one of which is shown at 68.

A base member in the form of an idler shaft 70 spans the cutout, with the ends of the shaft resting in the seats 58 of the idler shaft cradles 56. Idler shaft clamps 72 are bolted to the cradles to fix the shaft in position; the idler shaft does not rotate. As best seen in FIG. 4, the shaft has three pairs of spring pockets 74, one pocket on either side of a through bore 76. Each pocket 74 has a spring 78 disposed therein, as seen in FIG. 1. Bores 76 are parallel to the bolster axis 14. Each bore includes a counterbore at one end and receives a mounting means in the form of a guide pin 80 press fit therein.

A support means in the form of a bearing holder 82 is mounted on the guide pin. The bearing holder is a cylindrical sleeve surrounding the idler shaft 70. At the center of the holder is a shoulder 84 with aligned openings through the holder. These openings accept the guide pin 80. The fit between the bearing holder and guide pin is such that the holder will both slide on the pin longitudinally and pivot thereon as well. The holder is biased longitudinally of the guide pin by the springs 78.

A keyway 86 is cut on the outer surface of the bearing holders 82. The outer two bearing holders carry actuators 88 which extend parallel to the idler shaft 70. Two roller bearings 90 are mounted one each bearing holder. The bearings abut the shoulders 84 and are held in place by lockwashers 92 and locknuts 94 threaded onto the ends of the holders. The locknuts have a tang which engages the keyway 86 to prevent rotation of the bearing inner race.

The roller bearings 90 engage a hub 96 of a cylindrical drum or pulley 98, supporting the drum for rotation about the bearing holder. The outer surface of the drum supports the conveyor belt which wraps around the drum as it turns between forward and reverse runs. Note that since the bearing holder can slide on the guide pin 80, the drum is not necessarily concentric with the idler shaft. In fact, more often than not, the drum is eccentric to the idler shaft.

Three proximity sensors 100 are mounted on holders 102 adjacent each drum. Two of the holders are attached to top of the idler shaft clamps 72. The other holder rests on the center beam 48. The outer sensors normally contact one of the actuators 88. The central sensor normally contacts the surface of the center drum. The sensors are connected to the conversion system control panel. In the event one of the conveyor belts fails, the springs 78 will push the bearing holder 82 away from the sensor. When contact between the sensor and actuator or drum surface is lost, the sensor sends a signal to the control panel indicating which belt has broken and initiating a shutdown of the press.

The operation of the slide assembly is as follows. The air cylinder is pressurized to move rod 34 and slide 42 away from the cylinder. The slide, of source, carries the idler shaft 70 and drums 98 with it. The air cylinder pressure is regulated to apply a selected amount of tension on the conveyor belts. The belt tension compressed the springs 78 somewhat, as the bearing holders slide along guide pins 80 under the tension. Any camber of a belt results in pivoting of the drum about the guide pin. Each drum can pivot independently of the others. As mentioned above, the proximity sensors will report any loss of tension on a drum.

The slide assembly of this invention provides improved control of the belt tension and individual indication of belt failure. Multiple conveyors are provided so conveyors for different sized ends can be run simultaneously. Even with multiple pulleys, only one tensioning cylinder is required and the pulleys and slide can fit in the limited space available. Since the multiple pulleys afford individual response to belt camber, vibration is reduced which reduces the tendency for the ends to vibrate out of correct orientation in their belt openings.

While a preferred form of the invention has been shown and described, it will be understood that alteration and modifications could be made thereto without departing from the scope of the following claims.

We claim:

1. In a conversion system of the type having cooperatively-engageable, reciprocable upper and lower tooling defining a plurality of stations having tools which progressively convert shells into can ends, at least one endless conveyor for indexing shells into and through the stations of the tooling, the conveyor revolving around head and tail pulleys and defining a longitudinal axis, the improvement comprising a pulley for use as either a head pulley or tail pulley, comprising:
    a base member attached to the conversion system;
    a cylindrical drum defining an axis and having an outer surface engageable with the conveyor, the base member being a stationary shaft extending parallel to the axis of the drum;
    support means for mounting the drum for rotation about the drum's axis; and
    mounting means attached to the base member for mounting the support means such that support means is slidable on the mounting means in a direction parallel to the conveyor's longitudinal axis.

2. The structure of claim 1 further characterized in that the mounting means has a circular cross-section such that the support means is pivotable about the mounting means.

3. The structure of claim 1 further characterized in that the mounting means is perpendicular to the drum's axis.

4. The structure of claim 1 wherein the mounting means is a guide pin mounted in the shaft and extending perpendicular thereto.

5. The structure of claim 1 further comprising at least one pocket formed in the base member, a spring disposed in the pocket and engaging the support means to bias it away from the base member along the mounting means.

6. The structure of claim 1 wherein the drum has a hub and there is at least one bearing mounted between the hub and support means for rotatably mounting the drum.

7. The structure of claim 6 wherein the support means comprises a cylindrical sleeve having a mounting hole therein for receiving the mounting means and a shoulder for locating the bearing.

8. In a conversion system of the type having cooperatively-engageable, reciprocable upper and lower tooling defining a plurality of stations having tools which progressively convert shells into can ends, at least one endless conveyor for indexing shells into and through the stations of the tooling, the conveyor revolving around head and tail pulleys and defining a longitudinal axis, the improvement comprising a pulley for use as either a head pulley or tail pulley, comprising:
    a base member attached to the conversion system;
    a cylindrical drum defining an axis and having an outer surface engageable with the conveyor;
    support means for mounting the drum for rotation about the drum's axis; and
    mounting means attached to the base member for mounting the support means such that the support means is pivotable on the mounting means in a plane perpendicular to the conveyor's longitudinal axis.

9. The structure of claim 8 further characterized in that the support means is slidable on the mounting means in a direction parallel to the conveyor's longitudinal axis.

10. The structure of claim 8 further characterized in that the mounting means is perpendicular to the drum's axis.

11. The structure of claim 8 further characterized in that the base member is a stationary shaft extending parallel to the axis of the drum.

12. The structure of claim 11 wherein the mounting means is a guide pin mounted in the shaft and extending perpendicular thereto.

13. The structure of claim 8 further comprising at least one pocket formed in the base member, a spring disposed in the pocket and engaging the support means to bias it away from the base member along the mounting means.

14. The structure of claim 8 wherein the drum has a hub and there is at least one bearing mounted between the hub and support means for rotatably mounting the drum.

15. The structure of claim 14 wherein the support means comprises a cylindrical sleeve having a mounting hole therein for receiving the mounting means and a shoulder for locating the bearing, the mounting means having a circular cross-section such that the support means is pivotable about the mounting means.

16. In a conversion system of the type having a bolster defining a longitudinal system axis, cooperatively-engageable, reciprocable upper and lower tooling defining a plurality of stations having tools which progressively convert shells into can ends, the improvement comprising a take-up slide assembly for multiple conveyors including:
    a single idler shaft supported on the bolster perpendicular to the system axis;
    at least two cylindrical drums each having an axis and having an outer surface engageable with a conveyor;
    at least two support means, each mounting a drum for rotation about the drum's axis; and
    at least two mounting means attached to the idler shaft, each mounting a support means such that the support means is pivotable on the mounting means in a plane perpendicular to the system's longitudinal axis.

17. The structure of claim 16 further comprising:
    a single take-up slide slidably mounted on the bolster;
    a single take-up cylinder fastened to the bolster and having a rod attached to the take-up slide.

18. The structure of claim 16 further characterized in that the support means are slidable on the mounting means in a direction parallel to the system's longitudinal axis.

19. The structure of claim 18 further comprising sensing means for detecting the longitudinal position of each drum.

* * * * *